United States Patent
Buczkowski et al.

[11] Patent Number: 5,996,268
[45] Date of Patent: Dec. 7, 1999

[54] FISHING ROD MOTION INDICATOR WITH VISUAL AND AUDIBLE FEATURES

[76] Inventors: Andrzej Buczkowski, 1110 D Sheridan Ave., Elizabeth, N.J. 07208; Witalis Talejko, ul. Mickiewicza 27 m.104, Warsaw, Poland, 04-562

[21] Appl. No.: 09/041,046

[22] Filed: Mar. 6, 1998

Related U.S. Application Data

[60] Provisional application No. 60/041,451, Mar. 24, 1997.
[51] Int. Cl.⁶ .................................................. A01K 97/12
[52] U.S. Cl. .................................................................. 43/17
[58] Field of Search ............................................. 43/16, 17

[56] References Cited

U.S. PATENT DOCUMENTS

| 5,199,205 | 4/1993 | Klammer ..................................... 43/17 |
| 5,205,061 | 4/1993 | Echols, Jr. ................................. 43/17.5 |
| 5,682,703 | 11/1997 | Corbier ...................................... 43/17 |

FOREIGN PATENT DOCUMENTS

| 316476 | 5/1989 | European Pat. Off. ................... 43/17 |
| 570117 | 11/1993 | European Pat. Off. ................... 43/17 |
| 2639184 | 5/1990 | France ..................................... 43/17 |
| 3839168 | 8/1989 | Germany ................................... 43/17 |
| 6-169674 | 6/1994 | Japan ........................................ 43/17 |
| 1251187 | 10/1971 | United Kingdom ...................... 43/17 |
| 2025741 | 1/1980 | United Kingdom ...................... 43/17 |
| 2149631 | 6/1985 | United Kingdom ...................... 43/17 |
| 2150402 | 7/1985 | United Kingdom ...................... 43/17 |
| 2191372 | 12/1987 | United Kingdom ...................... 43/17 |
| 2209261 | 5/1989 | United Kingdom ...................... 43/17 |
| 2211056 | 6/1989 | United Kingdom ...................... 43/17 |
| 2216372 | 10/1989 | United Kingdom ...................... 43/17 |
| 2219181 | 12/1989 | United Kingdom ...................... 43/17 |
| 2222060 | 2/1990 | United Kingdom ...................... 43/17 |
| 2240019 | 7/1991 | United Kingdom ...................... 43/17 |
| 2248755 | 4/1992 | United Kingdom ...................... 43/17 |

*Primary Examiner*—Michael J. Carone
*Assistant Examiner*—Darren W. Ark

[57] ABSTRACT

An indicator is provided for detecting the motion of a fishing line on a fishing rod. The indicator contains a wheel guide, a portion of which is composed of a magnetically detectable metal with a groove on its outer edge to engage the fishing line. A cylinder containing a power supply and a motion sensing element, is located parallel to the axis of the rod and can rotate about its axis so that the motion sensing element can detect any motion of the wheel guide and actuate both audible and visual signals.

6 Claims, 2 Drawing Sheets

FISHING ROD MOTION INDICATOR WITH VISUAL AND AUDIBLE FEATURES

RELATED APPLICATIONS

This application claims priority of U.S. Provisional Application Ser. No. 60/041,451, filed on Mar. 24, 1997.

BACKGROUND OF THE INVENTION

1) Field of The Invention this invention is directed to a fishing rod motion indicator. In one aspect, this invention relates to an indicator which can be placed on a fishing rod and emits an audible sound and light when a fish takes the bait and/or line. In a further aspect the invention is directed to a portable device which can easily be affixed to and detached from a fishing rod.

2) Background Art

A variety of devices are disclosed in the prior art for use in conjunction with fishing rods, bobbers and the like. For example, U.S. Pat. No. 5,199,205, which issued Apr. 6, 1993 to M. S. Klammer, discloses and claims a fishing bobber which is illuminated for night fishing and changes color when a fish strikes the bait. There are also devices which can be attached to a fishing rod to indicate when the fishing line moves as would be the case when a fish strikes. U.S. Pat. No. 5,205,061, which issued on Apr. 27, 1993 to D. L. Echols Jr., discloses and claims a movement indicator for a flexible fishing rod. Light from a light emitting diode is transmitted by means of a length of optical fiber to a reflector cap at the end of the rod. when a fish bites, the end of the rod moves about and signals that a strike has occurred. However, there is no audible sound and if the fisherman is not watching his rod, he would be unaware of a strike.

It is therefore and object of the present invention to provide a fishing rod motion indicator with both audible and visual features. Another object is to provide a motion indicator which is portable and can easily be attached and detached from the rod. A still further object of the present invention is to provide a device which has two degrees of sensitivity in detecting movement in fishing line on a fishing rod. Another object of this invention is to provide a motion indicator which has few moving parts and is easily switched on and off. These and other objects will readily become apparent to those skilled in the art in light of the teachings herein set forth.

SUMMARY OF THE INVENTION

In its broad aspect this invention pertains to a indicator for detecting motion of a fishing line on a fishing rod and is comprised of:

a housing configured for mounting on a fishing rod, the housing having affixed thereto a rotatable wheel guide means, the outer edge of which has grooved means to engage the fishing line, and wherein at least a portion of the wheel means is composed of a magnetically detectable metal;

a hollow detachable cylinder slidably mounted in the housing and disposed so that the center axis of the cylinder is essentially parallel to that of the rod, the cylinder containing a power supply and motion sensing means, the sensing means being located off center from the axis of the cylinder;

the cylinder being rotatable about its axis whereby the motion sensing means is brought within sufficient proximity to the wheel guide means that any motion of the wheel is detectable and wherein the sensing means actuates both audable and visual signals to signify motion of the wheel guide means.

DESCRIPTION OF THE PREFERRED EMBODIMENTS

Figure 1:
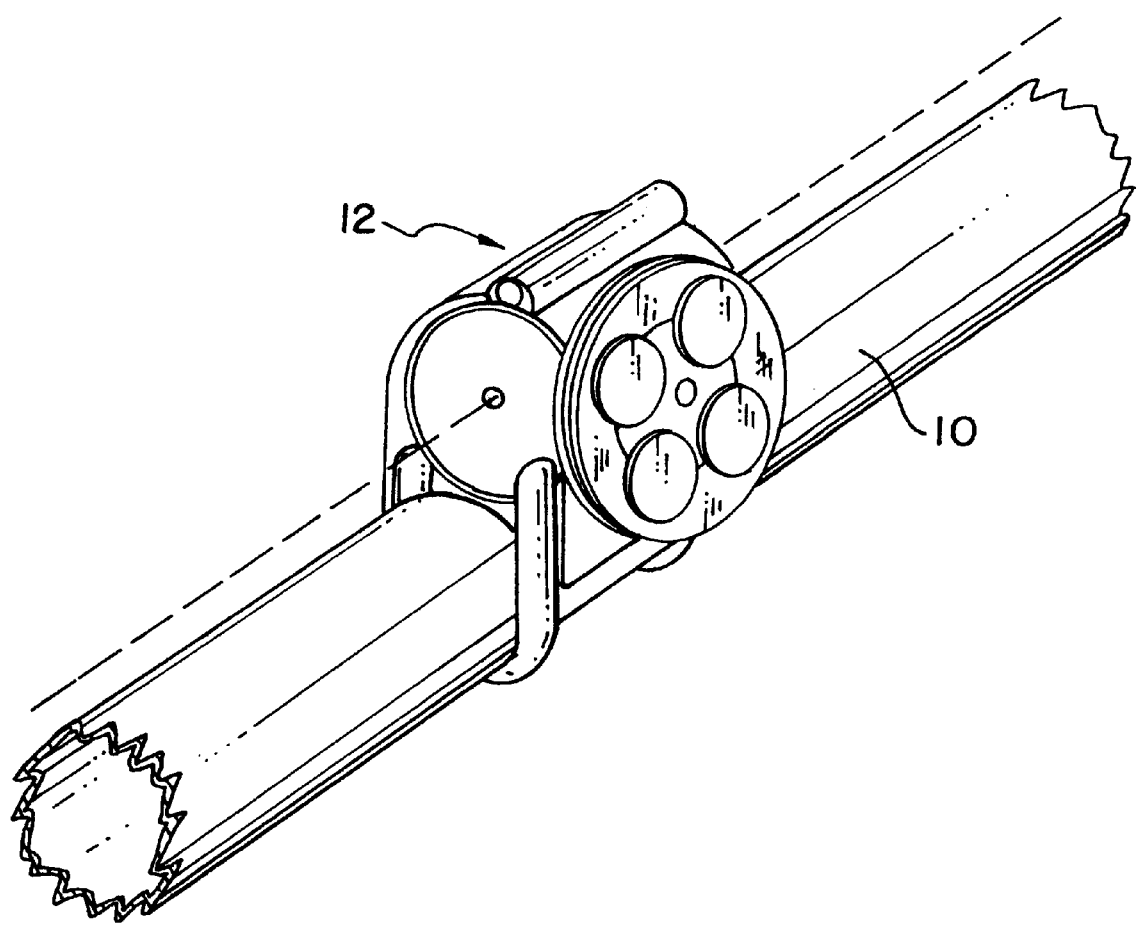
FIG. 1 is a fragmentary view of a fishing rod having affixed thereto the motion indicator device of the present invention. The fishing line is shown by the dotted line.

The invention will be more readily understood by reference to the drawings wherein:

FIG. 1 depicts a fragmentary view of fishing rod 10 having affixed thereto the motion indicator device 12 of the present invention. Fishing line represented by the dotted line engages the device in a groove located circumferentally on the outer edge of the rotatable wheel.

Figure 2:
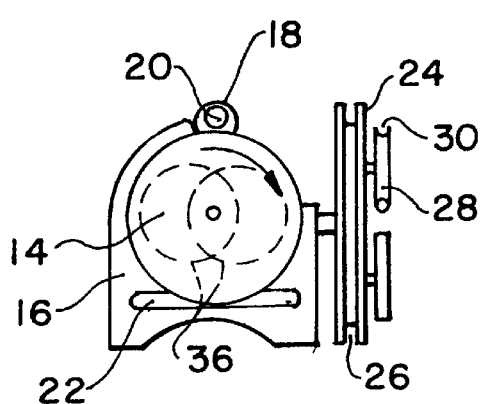
FIG. 2 is a front view of the motion indicator which faces the person holding the rod and from which an indicator light is visible.

FIG. 2 is a front view of the device 12 which faces the operator and depicts hollow cylinder 14 fitted in housing 16 whereby cylinder 14 can rotate about one quarter turn about its central axis to an "on" or "off" position. Cylinder 14 has a hollow tubular ridge 18 as part of its upper structure fitted at the end with a light emitting diode (LED) 20. Between the bottom of cylinder 14 and the concave seat of housing 16 is a flexible closed loop 22, both ends of which extend beyond the housing for attachment of the indicator to the shaft of a fishing rod. Fishing line guide wheel 24 is rotatably mounted on housing 16 and contains groove 26 which serves to guide the fishing line. One or more addditional smaller guides 28 are fixedly located on the outer surface of guide 24. At least one of guides 28 has a slit for a thinner fish line for use in fishing for smaller fish which would not be expected to exert a great pull on the line when taking the bait.

Guide wheel 24 is preferably made of rubber or plastic and has metal center portions, the movement of which is detected by the motion sensor contained in cylinder 14. The housing itself can also be fabricated from plastic as well as the cylinder.

Figure 3:
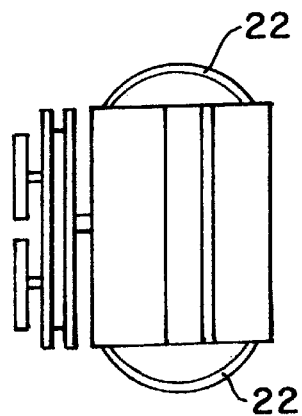
FIG. 3 is a top view of the motion indicator.

A top view of the motion indicator is shown in FIG. 3 and the end loops 22 depicted at each end. The loops will preferably be made of rubber or other strechable material to insure that the unit is firmly affixed to the fishing rod.

Figure 4:
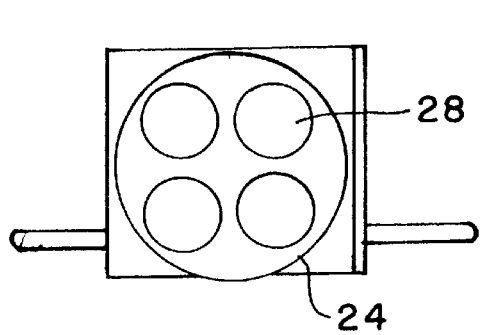
FIG. 4 is a side view of the indicator device showing the guide wheel which engages the fishing line.
Figure 6A:
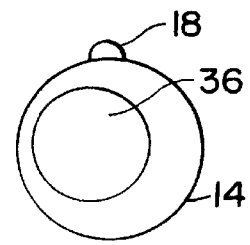
FIG. 6a is a sectional view taken on line 6a of FIG. 6.

FIG. 4 is a side view of the motion indicator showing main guide wheel 24 and small circular guides 28. In practice, only one of the smaller guides 28 need be notched with a small slit to accomodate a thin fish line or to less firmly engage a line which will cause the wheel to turn and effect a signal, but allow the line to fall off the guide and the fish to run with the bait. In some instances, depending on the kind of fish, it might be advisable to allow the fish to run with the bait until tired before attempting a landing.

Figure 5:
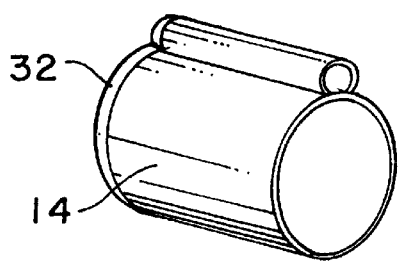
FIG. 5 is a side view of the rotatable barrel or cylinder that is removable from the body housing member and contains the power supply and motion sensor.

FIG. 5 is a view of the cylinder 14 separated from housing 16. Removal or the cylinder is easily accomplished by merely pushing the front of the cylinder towards the rear of the housing. The loop 22 which rests on the upper concave surface of the housing just below where the cylinder rests, can be affixed to the housing such as by glueing. The presence of the loop between the concave surface of the housing and the bottom of the cylinder serves to hold the cylinder in place by friction.

Access to the interior of the cylinder is by cap 32 attached to the rear of cylinder 14. The inner surface of the cap has wire contacts which bridge the positive end of the batteries to a wire running through tubular member 18 to LED 20.

Figure 6:
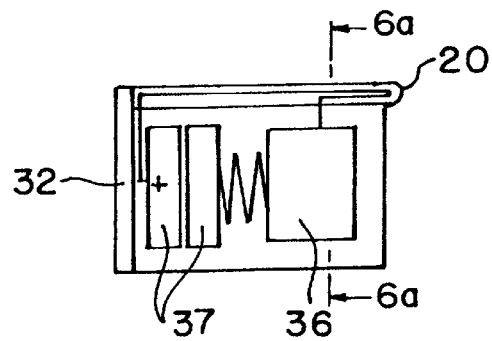
FIG. 6 is a cross-sectional schematic of the inside of the cylinder showing the placement of the batteries and the motion sensor.

FIG. 6 shows a partial schematic of the interior of the cylinder 14 depicting the location of batteries 34, LED 20 and motion detector or sensor 36. Motion detector or sensor 36 is disposed in cylinder 14 in such a manner that it is away from the cylinder center axis so that when cylinder 14 is rotated to the "off" position, the sensor is furthest from wheel 24. When it is desired to activate the unit, cylinder 14 is rotated about its center axis from the "off" position for about a quarter turn until tubular member 18 comes into contact with the edge of the housing unit 16 in the "on" position. When the rotation is complete, the motion detector or sensor within the cylinder is in close proximity to guide wheel 24 wherein it can detect any motion of the wheel and emit a beeper sound and also complete the circuit to activate the LED.

The motion detector or sensor 36 is commercially available and can be calibrated so to be sensitive to the limited range in which it traverses when the cylinder is rotated from the "off" position to the "on" position. One motion detector which is currently available is marketed under code B-OIPN. The batteries employed are also available commercially such as alkaline batteries LlI42, for example those sold under the VINNIC trademark.

The motion detector of the present invention is unique in several respects. It informs the fisherman of motion in the fish line both audibly and visually at the same time. The unit is very small and can be carried in one's pocket as well as being easy to affix to the fishing rod. It is relatively simple in design and inepensive to make and operate.

Although the invention has been illustrated by the preceding disclosure it is not to be construed as being limited to the materials employed therein. Various modifications and embodiments thereof can be made without departing from the spirit or scope thereof.

What is claimed is:

1. An indicator for detecting the motion of a fishing line on a fishing rod, said indicator comprised of:

a housing configured for mounting on a fishing rod, the housing having affixed thereto a rotatable wheel guide means to engage the fishing line, the outer edge of which has grooved means to engage the fishing line, and wherein at least a portion of the wheel means is composed of a magnetically detectable metal;

a hollow detachable cylinder slidably mounted in the housing and disposed so that the center axis of the cylinder is essentially parallel to the axis of the rod, the cylinder containing a power supply and motion sensing means for detecting motion and means for emitting audible and visual signals, the motion sensing means being located off center from the axis of the cylinder;

the cylinder being rotatable about its axis whereby the motion sensing means is brought within sufficient proximity to the wheel guide means such that any motion of the wheel is detectable and wherein the sensing means actuates both audible and visual signals to signify motion of the wheel guide means.

2. The indicator of claim 1 wherein the means for emitting the visual signal is a light emitting diode.

3. The indicator of claim 2 wherein the power supply for the light emitting diode is a battery contained within the housing.

4. The indicator of claim 1 wherein the means for emitting the audible signal is contained within the housing.

5. The indicator of claim 1 wherein the housing is fabricated from plastic.

6. A fishing rod fitted with the indicator of claim 1.

* * * * *